(12) United States Patent
Switzeny

(10) Patent No.: US 7,500,552 B2
(45) Date of Patent: Mar. 10, 2009

(54) TRANSPORTING DEVICE WITH TRANSPORTING BELT

(75) Inventor: Kurt Switzeny, Brunnen (CH)

(73) Assignee: Innova Patent GmbH, Wolfurt (AU)

( * ) Notice: Subject to any disclaimer, the term of this patent is extended or adjusted under 35 U.S.C. 154(b) by 0 days.

(21) Appl. No.: 11/593,313

(22) Filed: Nov. 6, 2006

(65) Prior Publication Data

US 2007/0074955 A1 Apr. 5, 2007

Related U.S. Application Data

(63) Continuation of application No. PCT/CH2005/000243, filed on May 2, 2005.

(30) Foreign Application Priority Data

May 10, 2004 (CH) .................................. 0815/04

(51) Int. Cl.
*B65G 15/00* (2006.01)
(52) U.S. Cl. .................. 198/686; 198/685; 198/836.1; 198/836.2; 198/836.3; 198/836.4
(58) Field of Classification Search ......... 198/683–686, 198/836.1, 836.2, 836.3, 836.4
See application file for complete search history.

(56) References Cited

U.S. PATENT DOCUMENTS

| | | | | |
|---|---|---|---|---|
| 2,681,134 A * | 6/1954 | White, Jr. | ................ | 198/836.1 |
| 2,751,065 A * | 6/1956 | Thomson | .................... | 198/818 |
| 2,903,123 A * | 9/1959 | Naylor | ...................... | 198/847 |
| 3,059,758 A * | 10/1962 | Walker | ...................... | 198/847 |
| 3,424,296 A * | 1/1969 | Steins | ......................... | 198/833 |
| 3,578,149 A | 5/1971 | Thomson | | |
| 4,410,082 A * | 10/1983 | McGinnis | .................. | 198/818 |
| 4,503,971 A | 3/1985 | Lachmann | | |
| 4,505,382 A | 3/1985 | Mareau | | |
| 4,615,434 A | 10/1986 | Lachmann | | |
| 4,998,482 A * | 3/1991 | Kunczynski | ............... | 104/178 |
| 5,141,101 A * | 8/1992 | Vance et al. | ................ | 198/847 |
| 5,219,064 A * | 6/1993 | Roman | ................... | 198/836.1 |
| 5,267,642 A * | 12/1993 | Gharpurey et al. | ....... | 198/836.1 |
| 6,575,294 B1 * | 6/2003 | Swinderman et al. | .... | 198/836.1 |
| 6,640,965 B2 * | 11/2003 | Trieb | .......................... | 198/839 |

(Continued)

FOREIGN PATENT DOCUMENTS

DE 954043 12/1956

(Continued)

OTHER PUBLICATIONS

International Search Report dated Nov. 28, 2005.

*Primary Examiner*—Douglas A Hess
(74) *Attorney, Agent, or Firm*—Laurence A. Greenberg; Werner H. Stemer; Ralph E. Locher

(57) ABSTRACT

A transporting device, for conveying goods over a conveying route, includes a transporting belt and at least one rope-like traction element for exerting a traction force upon the transporting belt. The transporting belt follows the traction element, at least along a transporting section of the conveying route, and is in communication therewith the traction element through a coupling. The coupling has at least one spring element which, in the aforementioned transporting section, encompasses the traction element, with spring effect, for the creation of a force coupling.

48 Claims, 6 Drawing Sheets

U.S. PATENT DOCUMENTS 7,182,202 B2 * 2/2007 Kalverkamp ............. 198/844.1

FOREIGN PATENT DOCUMENTS

| | | |
|---|---|---|
| DE | 968838 | 4/1958 |
| DE | 1029732 | 5/1958 |
| DE | 1070992 | 12/1959 |
| DE | 1 247 202 | 8/1967 |
| DE | 1756160 | 4/1970 |
| DE | 2217077 | 10/1973 |
| DE | 28 13 063 | 10/1978 |
| DE | 3414285 A1 | 10/1985 |
| EP | 1 338 531 B1 | 1/2004 |
| FR | 1110561 | 2/1956 |
| FR | 1344396 | 11/1963 |
| FR | 2 560 168 | 8/1985 |
| GB | 768569 | 2/1957 |
| GB | 795622 | 5/1958 |
| GB | 839752 | 6/1960 |
| GB | 1064200 | 4/1967 |
| GB | 1 591 461 | 6/1981 |
| RO | 101 572 | 2/1993 |
| WO | 8402324 A1 | 6/1984 |

* cited by examiner

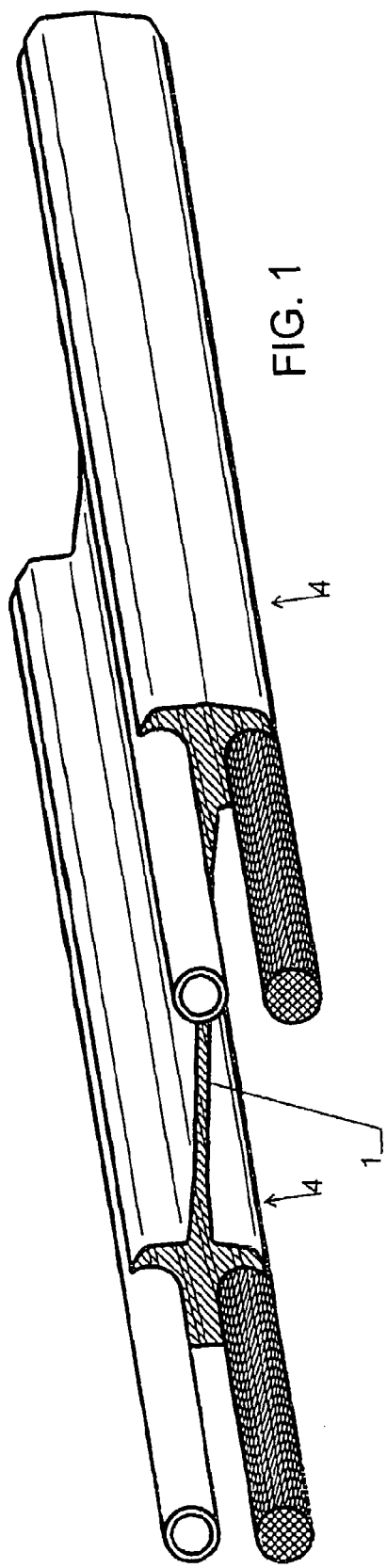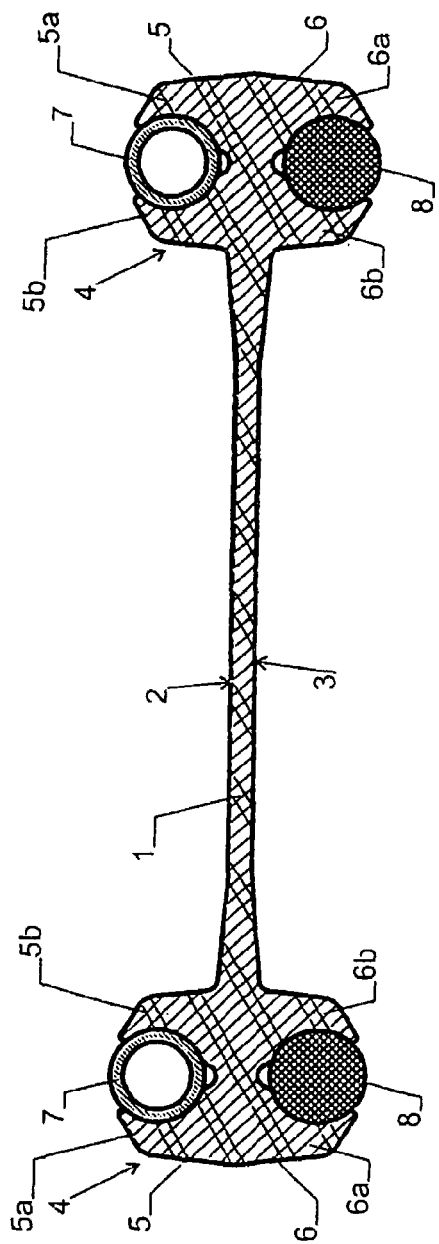

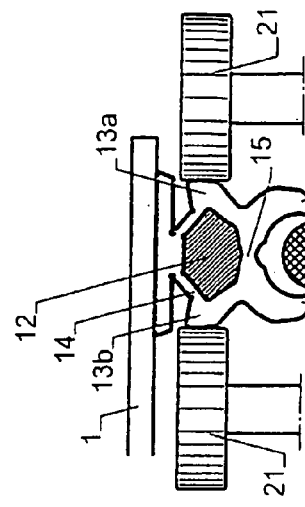
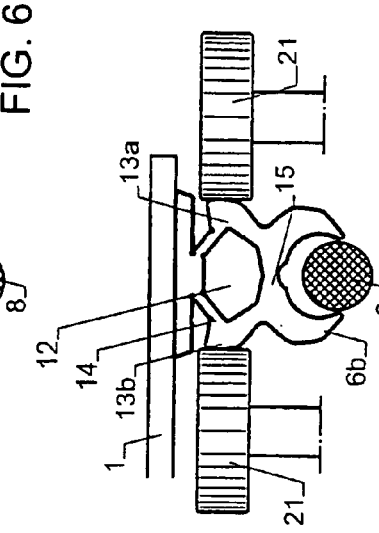
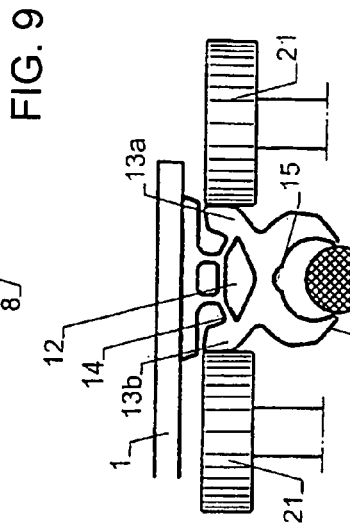
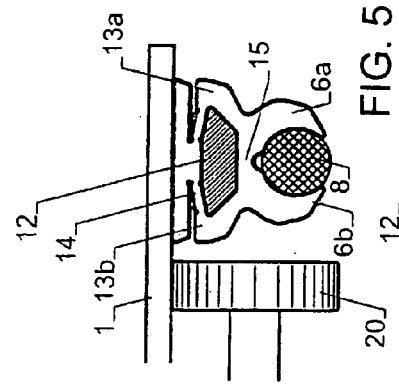
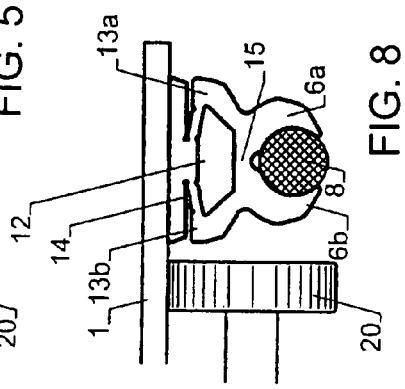
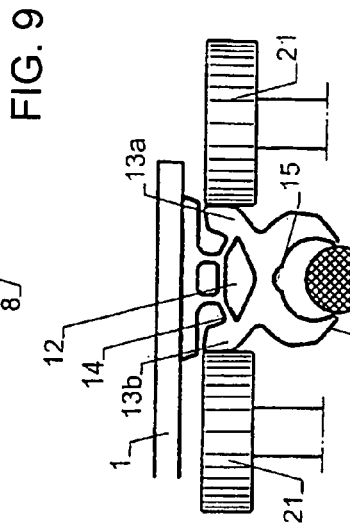
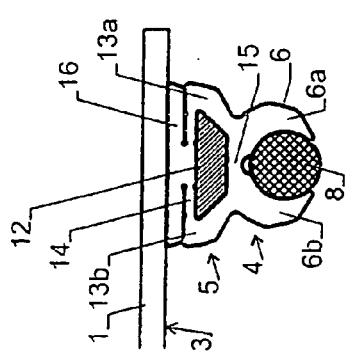
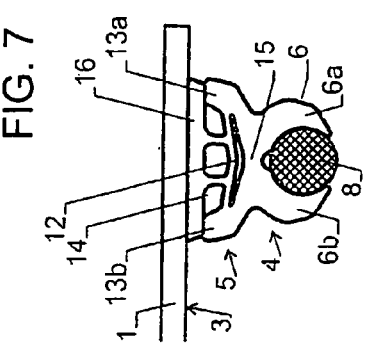

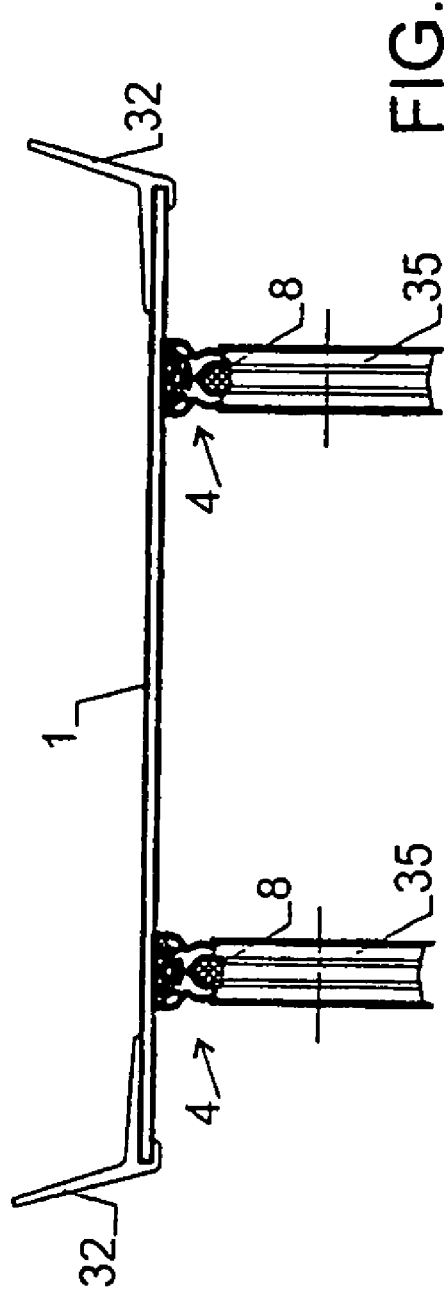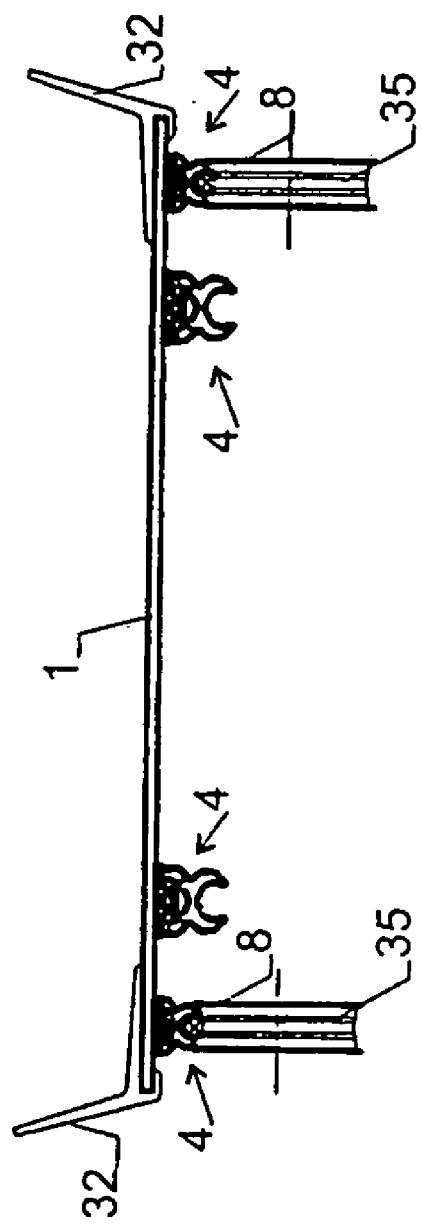

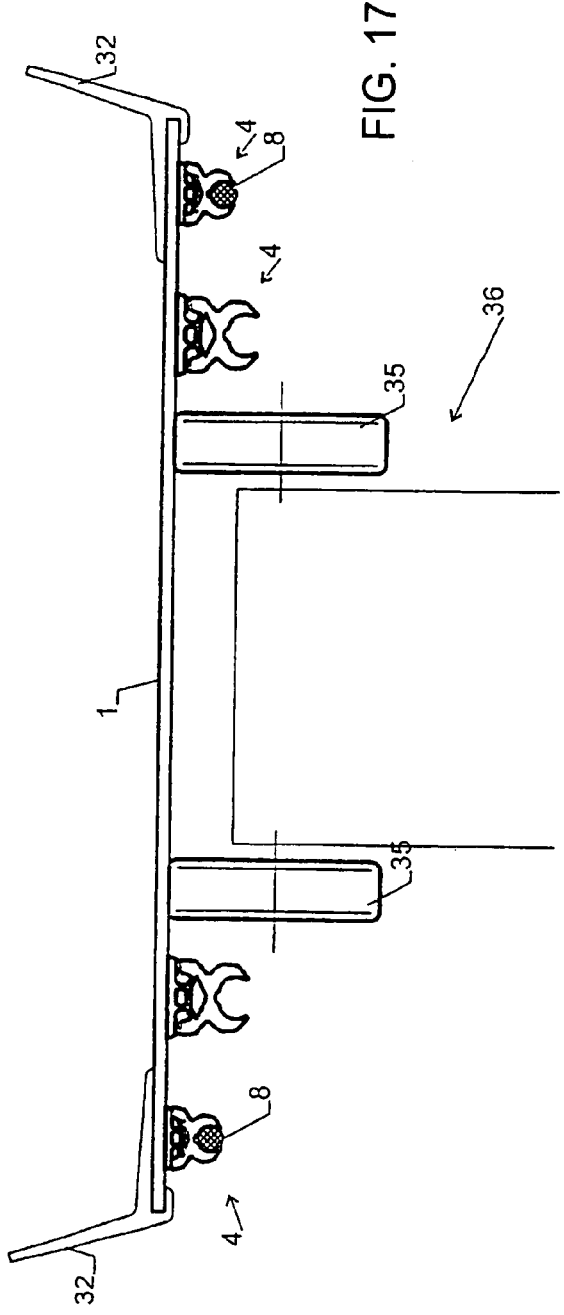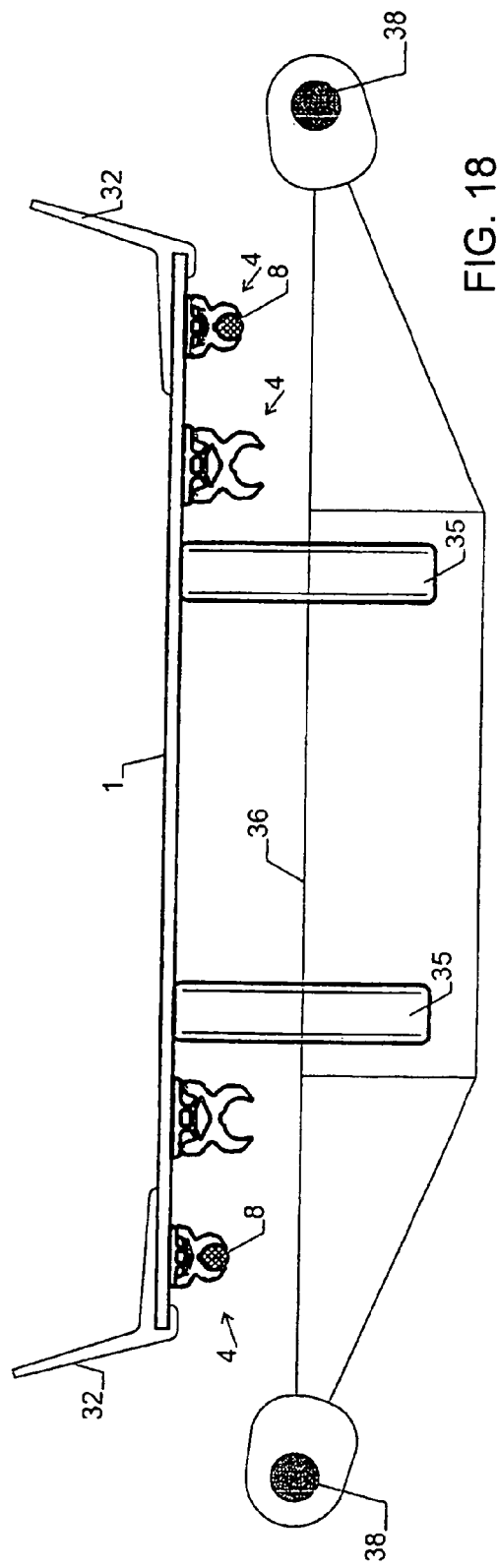

TRANSPORTING DEVICE WITH TRANSPORTING BELT

CROSS REFERENCE TO RELATED APPLICATION

This is a continuing application, under 35 U.S.C. §120, of copending International Application No. PCT/CH2005/000243, filed May 2, 2005, which designated the United States; this application also claims the priority, under 35 U.S.C. §119, of Swiss Patent Application CH 815/04, filed May 10, 2004; the prior applications are herewith incorporated by reference in their entirety.

BACKGROUND OF THE INVENTION

Field of the Invention

The invention relates to a transporting device for conveying goods over a conveying route. The transporting device has a transporting belt and at least one rope-like traction element for exerting a traction force upon the transporting belt. The transporting belt follows the traction element at least along a transporting section of the conveying route and is in communication there with the traction element through a coupling. The invention also relates to a transporting device for conveying goods over a transporting route, including a transporting belt and enclosing elements. The enclosing elements are disposed on the transporting belt and form side walls for the transporting belt. In this context, the term "goods" is to be understood in a broad sense, and especially also embraces loose material, piece goods, and even passengers.

Such transporting devices are known, for example, with reference to European Patent EP 1 338 531 B1, corresponding to U.S. Patent Application Publication No. US 2003/0155214 A1, French Patent Application FR 2 560 168 A1, German Patent Application DE 28 13 063 A1, corresponding to UK Patent Application GB 159 1461 A, Romanian Patent Application RO 101 572 A, or German Patent Application DE 1 247 202 A, corresponding to U.S. Pat. No. 3,424,296. They have a coupling, for example in the form of longitudinal slots formed on the transporting belt, which are in communication with ropes. In German Patent Application DE 28 13 063 A1, corresponding to UK Patent Application GB 159 1461 A, the ropes are constructed as traction elements, which are connected to drive motors.

Furthermore, devices are also known in which the transporting belt is hauled upon rollers by the track ropes of a cableway. That allows the advantages of the cableway to be utilized in the open country. However, the high costs for the transporting belt, with the large number of integrated running rollers, as well as the demand for electrical power, maintenance, etc., are disadvantageous.

It is advantageous to equip the transporting belt with side walls, especially in the case of loose material. For that purpose, vertical walls are provided on the sides of the transporting belt in European Patent EP 1 338 531 B1, corresponding to U.S. Patent Application Publication No. US 2003/0155214 A1. However, in order to ensure that the transporting belt can be guided around deflection rollers, those walls are folded in the manner of a bellows, so that they can be stretched or compressed. The manufacture of such walls, however, is costly.

SUMMARY OF THE INVENTION

It is accordingly an object of the invention to provide a transporting device with a transporting belt, which overcomes the hereinafore-mentioned disadvantages of the heretofore-known devices of this general type and which creates a versatile and yet inexpensive transporting system, which can be used in the most varied terrain.

With the foregoing and other objects in view there is provided, in accordance with the invention, a transporting device for conveying goods over a conveying route. The transporting device comprises a transporting belt and at least one rope-like traction element for exerting a traction force upon the transporting belt. The transporting belt follows the at least one traction element at least along a transporting section of the conveying route. A coupling, through which the transporting belt and the at least one traction element communicate in the transporting section, has at least one spring element encompassing the at least one traction element with springiness in the transporting section, to create a force coupling.

This allows the transmission of high traction forces. The transporting belt can be used as a simple carrying element, and does not need to be constructed as a traction element. The same transporting belt can thus be used, for example, to overcome large height differences and can also be used in flat terrain. A system change between different terrain sections can be dispensed with.

A "rope-like" traction element is understood in this case to be a traction element, which is long and flexible in the manner of a rope so that it can be guided and deflected, for example by support rollers. For example, it can be a steel cable, a chain, or a profiled belt.

In accordance with another feature of the invention, the same transporting belt can be guided without interruption over different transporting sections, even if the transporting sections have separate and possibly even different traction elements. For this purpose, a device is preferably provided between the transporting sections, by which the spring elements can be released from the traction element of one section, and connected to the traction element of the next section.

With the objects of the invention in view, there is also provided a transporting device for conveying goods over a transporting route. The transporting device comprises a transporting belt and enclosing elements disposed on the transporting belt and forming side walls for the transporting belt. The side walls are flexible and disposed at an angle, other than a right angle, relative to the transporting belt.

This simple construction allows the transporting belt to be guided around the deflection rollers without the side walls being damaged. The angle between the transporting belt and the side walls is adapted in each case so that no excessive compression or stretching of the side walls takes place.

Corresponding enclosing elements can be constructed, for example as straight longitudinal profiles with a basically constant cross section.

Transporting devices according to the invention can be used, for example, for the conveyance of loose material or piece goods, but can also be used for passenger transportation.

Other features which are considered as characteristic for the invention are set forth in the appended claims.

Although the invention is illustrated and described herein as embodied in a transporting device with a transporting belt, it is nevertheless not intended to be limited to the details shown, since further developments, advantages and applications of the invention as well as various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, perspective view of a first embodiment of the invention;

FIG. 2 is a longitudinal-sectional view through the embodiment according to FIG. 1;

FIG. 4 is a longitudinal-sectional view through the edge region of the transporting belt and a coupling of a second embodiment of the invention;

FIG. 5 shows the sectional view according to FIG. 4 in the region of a lift roller of a spreading device;

FIG. 6 shows the sectional view according to FIG. 4 in the region of press-on rollers of a spreading device;

FIG. 7 is a longitudinal-sectional view through the edge region of the transporting belt and a coupling of a third embodiment of the invention;

FIG. 8 shows the sectional view according to FIG. 7 in the region of the lift roller of a spreading device;

FIG. 9 shows the sectional view according to FIG. 7 in the region of the press-on rollers of a spreading device;

FIG. 10 is a longitudinal-sectional view through the edge region of the transporting belt and a coupling of a fourth embodiment of the invention;

FIG. 11 shows the sectional view according to FIG. 10 in the region of the lift roller of a spreading device;

FIG. 12 shows the sectional view according to FIG. 10 in the region of the press-on rollers of a spreading device;

FIG. 15 is a reduced, longitudinal-sectional view through the transporting belt on two support rollers;

FIG. 16 is a longitudinal-sectional view through another embodiment of the transporting belt on two support rollers;

FIG. 17 is a longitudinal-sectional view through a further embodiment of the transporting device on two support rollers; and FIG. 18 is a longitudinal-sectional view through a further embodiment of the transporting device, with a support structure which is installed on track ropes of a cableway.

DESCRIPTION OF THE PREFERRED EMBODIMENTS

Figure 3:
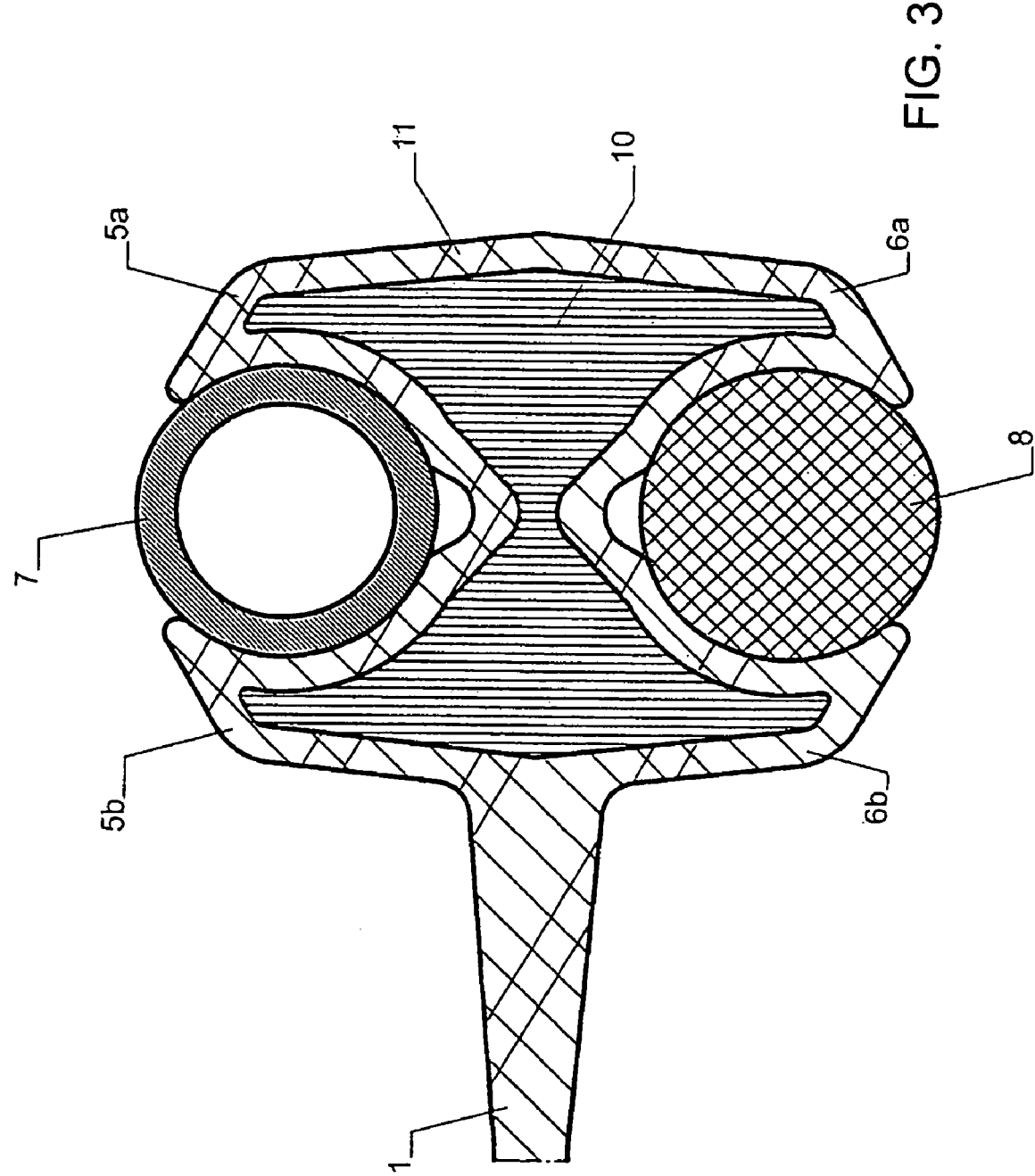
FIG. 3 is an enlarged, longitudinal-sectional view through an edge region of the transporting belt and a coupling of a variant of the first embodiment.

Referring now to the figures of the drawings in detail and first, particularly, to FIGS. 1 and 2 thereof, there is seen a first embodiment of a device according to the invention, which has a transporting belt 1 with an upper side 2 and a lower side 3, wherein the upper side 2 is provided for holding goods or passengers. The transporting belt 1 is connected along its side edges to a spring element 4, or to a coupling, as the case may be. Each spring element 4 includes an upper section, which is referred to below as a holder 5, and a lower section, which forms a gripper 6 with two fingers 6a, 6b.

In the illustrated embodiment, the transporting belt 1, as well as components of the spring elements 4, are formed in one piece from a profile or section of durable, flexible synthetic material, for example hard rubber.

A relatively transversely rigid profile section 7 is installed in the holder 5 of each spring element 4. The profile section 7 is gripped on both sides by arms 5a, 5b of the holder 5.

The fingers 6a, 6b of the gripper 6 grip around a rope 8 with elastically springing effect, in fact over a circumference of more than 180° (by about 270° in the example which is shown), so that the traction rope 8 can only be removed from the gripper 6, or inserted in the gripper 6, as the case may be, by spreading the fingers 6a, 6b. As the rope 8 is gripped, the inner shape of the gripper 6 corresponds basically to the gripped outer shape of the rope 8, so that a good frictional engagement is ensured. If the outer side of the rope 8 has moldings or recesses which extend transversely or obliquely, the inner side of the gripper 6 can also have a corresponding shaping, so that together with the moldings or recesses, as the case may be, it forms a form lock, and enables even higher forces to be transmitted. A form-locking connection is one which connects two elements together due to the shape of the elements themselves, as opposed to a force-locking connection, which locks the elements together by force external to the elements.

In this first embodiment of the invention, the transversely rigid profile section 7 presses the arms 5a, 5b of the holder 5 away from each other which, due to a certain rigidity of the connection between the arms 5a, 5b and the respective fingers 6a, 6b, leads to the fingers 6a and 6b being compressed against the outer sides of the rope 8. That further improves the frictional connection between the spring element 4 and the rope 8.

The spring element 4, as shown in FIG. 3, can also have a relatively soft core 10, which is enclosed by a cover 11 of relatively stiff material. This enables improved transmission of the spreading force which the transversely rigid profile section 7 exerts upon the arms 5a, 5b, as a compression force to the fingers 6a, 6b.

The rope 8 acts as a traction rope, i.e. traction forces for transporting the transporting belt 1 are first transmitted by one or more motors to the rope 8, and the rope 8 transmits them through the spring elements 4 to the transporting belt 1.

If the transporting belt 1 is used in a cableway, then the rope 8 also acts at the same time as a track rope and, therefore, as a carrying rope, i.e. in addition to the traction force, it also absorbs the weight force of the transporting belt 1 and the goods lying upon it, between masts of the cableway. However, it is also conceivable that, in addition to the rope 8 acting as a traction rope, a separate track rope may be provided. This is explained in detail below, with reference to FIG. 18.

A further family of embodiments of the invention is shown in FIGS. 4 to 12, wherein only one edge section of the transporting belt 1 and one of the spring elements 4 is shown in each case.

In these embodiments, the spring element 4 is installed to be fixed or detachable on the lower side 3 of the transporting belt 1, and absorbs its weight force, as long as the transporting belt 1, as is to be described below, is not supported in another way. The spring element 4, as in the first embodiment, is constructed as a long molded profile or section which extends parallel to the longitudinal direction of the transporting belt 1, in fact over at least a part of its length. The length of the spring element 4 is substantially greater than the diameter of the rope 8, so that a connection of large surface area between the rope 8 and the spring element 4, and a correspondingly good transmission of force, is ensured. It is also conceivable, however, to use a plurality of relatively short spring element sections, which are distributed and spaced apart along the transporting belt 1.

As is shown, the spring element 4 in turn has on its lower side a gripper 6 with fingers 6a, 6b, by which the rope 8 can be gripped, with springing effect. The holder 5 serves in turn for pressing the fingers 6a, 6b against the rope 8. If the fingers 6a, 6b are to be released from the rope 8, the holder 5 must be elastically deformed.

The holder 5 has a central section 12 between side sections 13a, 13b. Furthermore, a first bridge 14 and a second bridge 15 extend between the side sections, so that the central section 12 comes to lie between the side sections 13a, 13b, below the first bridge 14 and above the second bridge 15. The weight of the transporting belt 1 rests upon the middle of the bridge, through a connecting plate 16.

The central section 12 has lower rigidity than the side sections 13a, 13b. For this purpose, in the embodiment according to FIGS. 4 to 6, it is constructed from a different, softer material than the side sections 13a, 13b, and in the embodiments according to FIGS. 7 to 12, it is constructed to be hollow.

This development allows a simple opening of the gripper 6. This is illustrated with reference to FIGS. 5, 6, 8, 9, or 11 and 12, as the case may be. These figures show a spreading device, which serves for spreading the fingers 6a, 6b of the spring element 4, so that the spring element can be released from the rope 8, or can be seated upon the rope 8. Such a spreading device, for example, can be provided at the end of a transporting section, where the transporting belt 1 has to be released from one rope and be connected, for example, to the rope of the next transporting section.

The spreading device is constructed so that it deforms the holder 5 in such a way that the fingers 6a, 6b are spread. For this purpose, in the embodiments which are shown, the transporting belt 1 is first guided over lift rollers 20 which lift it relative to the rope 8, for example, by virtue of the transporting belt running directly onto the lift rollers 20 and the rope being deflected downwards. As a result of this, the bridge 14 is bent upwards and draws the side sections 13a, 13b towards the middle. The second bridge 15 is consequently similarly slightly bent, and acts as a joint, around which the side section 13a tilts, together with the finger 6a, and around which the side section 13b tilts, together with the finger 6b, so that the fingers 6a, 6b are pressed apart. A first releasing of the fingers 6a, 6b from the rope 8, or at least a first reduction of the press-on force, results as a consequence of this action.

In the next step, the holder 5 is compressed horizontally by two press-on rollers 21. As a result of this, the central section 12 is further deformed, and the first bridge 14, which is already pre-bent upwards, is bent further upwards. Since the second bridge 14 is thicker and stiffer, it is compressed less by the press-on rollers 21, and is bent only a little, as a result of which the fingers 6a, 6b are spread far apart, enough for the rope 8 to be withdrawn from the gripper 6.

The steps according to FIGS. 5 and 6 are carried out in reverse sequence for the insertion of a new rope 8 into the gripper 6.

The embodiment according to FIGS. 10 to 12 differs from that according to FIGS. 7 to 9 in that the first bridge 14 is pre-bent into the central section 12 without the action of the lift rollers 20, and forms a toggle lock. The toggle lock creates a clamping force which is largely independent of the true weight of the transporting belt 1 and the goods standing upon it. In this embodiment, a horizontal compression of the side sections 13a, 13b would lead to the first bridge 14 being pressed further into the central section 12 and being pushed against the second bridge, so that the opening of the fingers 6a, 6b, shown in FIG. 12, would not occur. It is only if the transporting belt 1 is first lifted through the use of the lift rollers 20 relative to the rope 8, or the rope is lowered, as the case may be, that the first bridge 14 bends outwards and a subsequent horizontal compression by the press-on rollers 21 leads to the opening of the gripper 6, which is shown in FIG. 12.

In all of the embodiments according to FIGS. 4 to 12, the fingers 6a, 6b are wholly or partially compressed by the weight force of the transporting belt 1, while the transporting belt 1 presses on the first bridge 14 and prevents it from being deflected upwards. Since the weight of the transporting belt rests upon the holder 5, and a vertical compression of the holder 5 leads to a compression of the fingers 6a, 6b, an additional securing of the rope 8 can be achieved in this manner.

Figure 13:
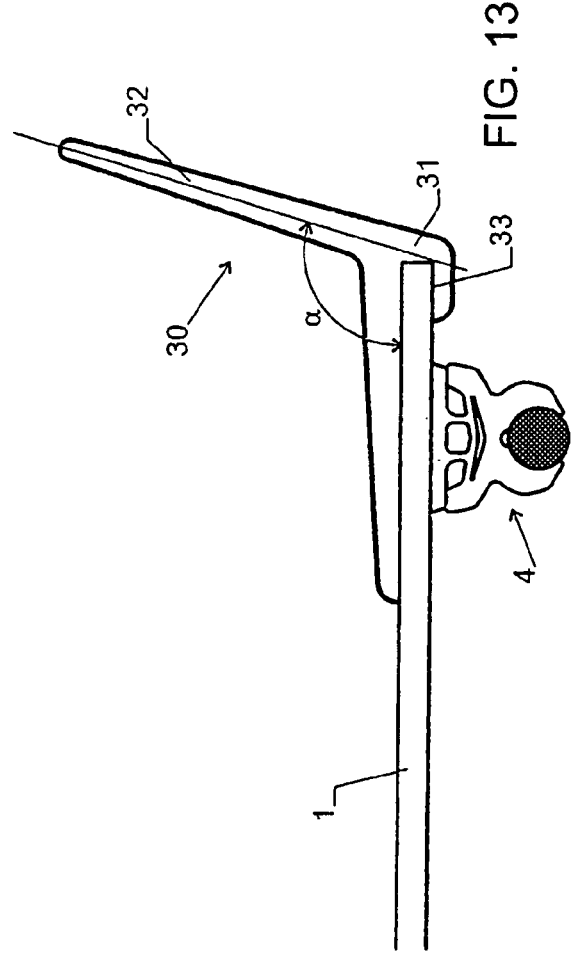
FIG. 13 is a fragmentary, longitudinal-sectional view through the edge region and a side wall of a transporting belt.
Figure 14:
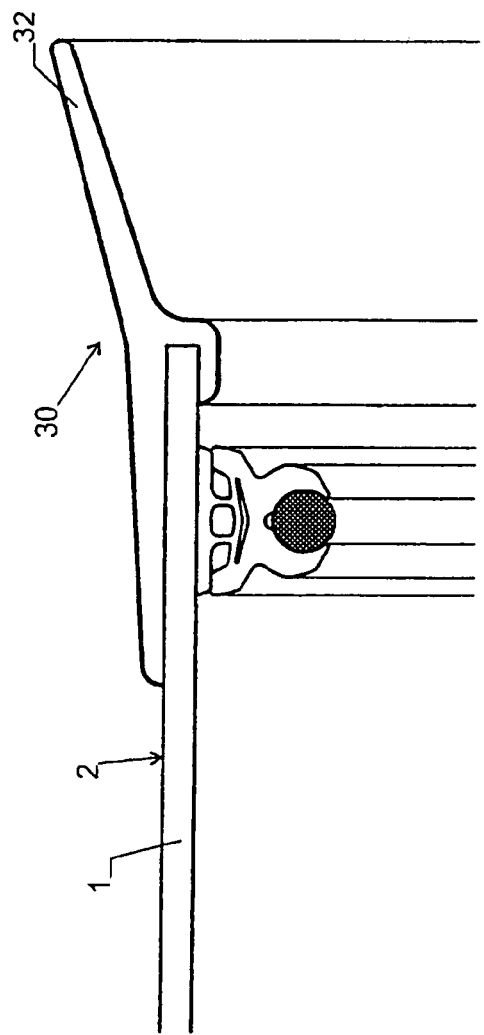
FIG. 14 shows the sectional view according to FIG. 13, with the transporting belt in a bowed state.

A further aspect of the invention under consideration relates to the side walls of the transporting belt. FIGS. 13 and 14 disclose an embodiment of corresponding side walls.

As is shown, enclosing elements 30 are attached to the edges of the transporting belt 1. In the exemplary embodiment under consideration two profile elements of synthetic material are concerned in this case. Each enclosing element 30 has a base 31 and a side wall 32. The base 31, for example, has a slot 33 which holds the respective edge of the transporting belt 1. The side wall 32 projects outwards. An angle $\alpha$ between the side wall and the transporting belt, in the non-tensioned state of the enclosing element, is not a right-angle and is, for example, 105°. A larger or smaller angle $\alpha$ can also be selected, according to the goods which are to be transported. In any case, the angle $\alpha$ should not lie too close to 90°, so that in the event of sagging or deflection of the belt around a bend axis which is perpendicular to the longitudinal axis of the belt and parallel to the upper side 2, the side wall, in a defined manner, leans outwards (or, for $\alpha<90°$, leans inwards, should the occasion arise), as is exemplarily shown in FIG. 14.

The enclosing elements 30 can be installed to be fixed or detachable on the transporting belt 1. With a fixed configuration, the enclosing elements 30 can also be constructed in one piece with the transporting belt 1.

As was already mentioned, the transporting belt 1 can be installed on the conveying rope, or conveying ropes, as the case may be, of a cableway, in which the height of the supports or the masts, as the case may be, is insignificant. Additionally, an incline can easily be overcome, wherein the dimensioning of the conveying ropes is to be simply adapted to the respective traction forces. In this case, the conveying ropes are guided in a recognized manner over support rollers which are fastened to the supports. FIGS. 15 and 16 show a section through the transporting belt on two conveying ropes 8.

On the other hand, the transporting belt 1 can also be guided close to the ground, or on a support structure 36, as the case may be, in the manner of a conveying belt. The latter is shown in FIG. 17. In this case, the ropes 8 do not act as conveying ropes, but purely as traction ropes, i.e. they have no actual carrying function, or only a slight carrying function. On the contrary, the weight is absorbed primarily by the stationary support structure.

FIG. 15 shows an embodiment with two spring elements 4. Each spring element encompasses one of the conveying ropes 8, which is guided over support rollers 35.

FIG. 16 shows a further embodiment. FIG. 16 differs from FIG. 15 in that, in this case, a plurality of different spring elements 4 are installed next to one another on the transporting belt 1. The spring elements 4 serve for holding ropes which have different sizes or different cross sections, as the case may be. In the embodiment which is shown in FIG. 16, the outer, smaller spring elements 4 hold a relatively thin rope 8, which serves purely as a traction rope in a relatively flat stretch with numerous support rollers 35, or serves as a conveying rope in a short cableway section. The larger, inner spring elements 4 are for use in steeper or more mountainous transporting sections, where the transportation route is formed as a cableway, and/or where the cable has to absorb higher traction forces.

Finally, an embodiment where the rope 8 basically serves as a traction rope, without actual carrying action, is shown in FIG. 17. In this embodiment, the support rollers 35 of the support structure 36 are in contact directly with the underside 2 of the transporting belt 1, and support the latter.

It is also conceivable to support the transporting belt 1 in another manner. Thus, the support structure can be constructed, for example, to support the transporting belt on a sliding surface, wherein a sliding substance, especially a gaseous or liquid sliding substance, such as air or grease, is provided for the reduction of friction effects between the transporting belt and the support structure.

In the embodiment according to FIG. 17, the support structure 36 preferably rests on the ground. However, it is also conceivable to fasten the support structure on one or more track ropes 38 of a cableway, as is shown in FIG. 18.

As was mentioned at the beginning, the rope 8 can be a traction or conveying rope, preferably in the form of a steel cable. However, a plastic rope, or a long,. flexible profile element, or a chain of more or less rigid links, can be used, according to the application and forces to be expected.

The transporting belt 1 can be constructed as an endless belt, or can be formed of individual transporting belt sections, wherein, in the latter case, the transporting belt sections can be in direct communication with each other, or can be independent of each other. The transporting belt sections can be constructed to be plate-like, flat elements, as are used, for example, in passenger walkways or, for example, can have the form of steps of an escalator. The transporting belt sections are preferably made of synthetic material or metal, for example aluminum.

The transporting belt can be reversed, for example, by 180° for the return thereof. During the return, it can be orientated so that the actual upper side 1 comes to lie downwards. In this case, the spring elements 4 are loaded under tension (which, however, does not necessarily have to lead to problems, since the transporting belt, as a rule, has no goods to carry during the return, so that its weight is small), or additional spring elements 4 can be provided on the upper side 2, which grip one or more ropes, in each case, below the belt during the return, or the transporting belt 1 has to be supported by additional support rollers.

The transporting belt 1, however, is preferably reversed so that the spring elements 4 come to lie downwards, even during the return. This, for example, can be carried out in the manner shown in European Patent EP 1 338 531 B1, corresponding to U.S. Patent Application Publication No. US 2003/0155214 A1. Other reversing techniques for transporting belts are also known to a person skilled in the art.

Two ropes 8, for the hauling and/or supporting of the transporting belt 1 in each case, are provided in FIGS. 15-17. However, just one rope 8 can be used, or more than two ropes or other traction elements can be used, according to developments of the invention.

While preferred embodiments of the invention are described in the application under consideration, it is to be clearly emphasized that the invention is not limited to these, and can also be embodied in other ways within the scope of the subsequent claims.

I claim:

1. A transporting device for conveying goods over a conveying route, the transporting device comprising:
   a transporting belt;
   at least one rope-like traction element for exerting a traction force upon said transporting belt;
   said transporting belt following said at least one traction element at least along a transporting section of the conveying route; and
   a coupling through which said transporting belt and said at least one traction element communicate in the transporting section, said coupling having at least one spring element with a lower part and an upper part, said lower part having a gripper with two fingers encompassing said at least one traction element with springiness in the transporting section, to create a force coupling, and said upper part having arms or side sections rigidly connected with said fingers of said lower part and wherein said arms or side sections are spread apart for coupling said gripper with said traction element.

2. The transporting device according to claim 1, wherein:
   the transporting section is one of several transporting sections;
   said at least one traction element includes several separate traction elements each associated with a respective one of the transporting sections;
   said at least one spring element includes several spring elements; and
   devices are disposed between the transporting sections for releasing one of said spring elements from one of said traction elements in one of the transporting sections and for connecting said one spring element to another of said traction elements in the next transporting section.

3. The transporting device according to claim 2, wherein said traction elements in the different transporting sections have different cross sections, at least in part.

4. The transporting device according to claim 1, which further comprises support rollers over which said at least one traction element runs.

5. The transporting device according to claim 4, which further comprises supports on which said support rollers are disposed.

6. The transporting device according to claim 1, wherein said at least one traction element largely absorbs the weight of said transporting belt, and optionally the weight of the goods in the transporting section.

7. The transporting device according to claim 1, which further comprises a stationary support structure installed beneath said transporting belt for absorbing the weight of said transporting belt.

8. The transporting device according to claim 7, which further comprises a sliding substance reducing friction effects between said transporting belt and said support structure.

9. The transporting device according to claim 8, wherein said sliding substance is at least one of air or grease.

10. The transporting device according to claim 7, wherein said support structure has support rollers in communication with said transporting belt.

11. The transporting device according to claim 7, wherein said support structure is installed on at least one track rope of a cableway.

12. The transporting device according to claim 1, wherein said at least one spring element grips around more than 180° of a circumference of said at least one traction element.

13. The transporting device according to claim 1, wherein said at least one spring element has a gripper with an internal shape corresponding to an external shape of said at least one traction element to be gripped.

14. The transporting device according to claim 13, wherein said external shape of said at least one traction element has at least one molding or recess extending transversely or obliquely, and said internal shape of said gripper has a shape forming a form closure together with said at least one molding or recess.

15. The transporting device according to claim 1, wherein said at least one traction element is a rope.

16. The transporting device according to claim 1, wherein said at least one spring element grips around said at least one traction element by a length being substantially larger than a diameter of said at least one traction element.

17. The transporting device according to claim 16, wherein said at least one spring element is a molded profiled section disposed along said transporting belt, over at least a partial length of said transporting belt.

18. The transporting device according to claim 1, wherein said transporting belt has a holding side for holding the goods, and said at least one spring element is disposed on a side of said transporting belt opposite to said holding side.

19. The transporting device according to claim 1, wherein said transporting belt is endless.

20. The transporting device according to claim 1, wherein said transporting belt is formed of individual transporting belt sections.

21. The transporting device according to claim 1, wherein said at least one traction element includes traction elements with different cross sections, and said at least one spring element includes several different spring elements disposed next to one another along said transporting belt, for holding said traction elements with different cross sections.

22. A transporting device for conveying goods over a conveying route, the transporting device comprising:
   a transporting belt;
   at least one rope-like traction element for exerting a traction force upon said transporting belt;
   said transporting belt following said at least one traction element at least along a transporting section of the conveying route; and
   a coupling through which said transporting belt and said at least one traction element communicate in the transporting section, said coupling having at least one spring element encompassing said at least one traction element with springiness in the transporting section, to create a force coupling; and
   a spreading device for spreading said at least one spring element at least at one end or start of the transporting section.

23. The transporting device according to claim 22, wherein said spreading device spreads said at least one spring element for inserting or releasing said at least one traction element.

24. The transporting device according to claim 23, wherein said at least one spring element has two fingers and an elastic holder, said fingers grip around said at least one traction element, and said fingers are held in said elastic holder and spread by elastic deformation of said holder for releasing said at least one traction element.

25. The transporting device according to claim 24, wherein said spreading device deforms said elastic holder to spread said fingers.

26. The transporting device according to claim 25, wherein said spreading device horizontally compresses said holder.

27. The transporting device according to claim 24, wherein said holder includes a central section and side sections, and said fingers are spread by compressing said side sections.

28. The transporting device according to claim 27, wherein said central section is deformable by compressing said side sections.

29. The transporting device according to claim 27, wherein said central section has lower rigidity than said side sections.

30. The transporting device according to claim 29, wherein said central section is hollow or formed of a different material than said side sections.

31. The transporting device according to claim 27, wherein said holder has a first bridge extended between said side sections.

32. The transporting device according to claim 31, wherein said transporting belt rests at least partially on said first bridge.

33. The transporting device according to claim 31, wherein said holder has a second bridge extended between said side sections, said gripper is disposed closer to said second bridge than to said first bridge, and said first and second bridges and said side sections define a section therebetween being hollow or being formed of a softer material than said bridges and said side sections.

34. The transporting device according to claim 33, wherein said spreading device presses said side sections against each other, causing said first bridge to be deformed to a greater extent than said second bridge and causing said gripper to spread.

35. The transporting device according to claim 34, wherein said spreading device lifts said transporting belt relative to said at least one traction element and/or lowers said at least one traction element relative to said holder, to create a deformation of said first bridge.

36. The transporting device according to claim 35, wherein said holder permits an opening of said gripper by horizontally compressing said side sections, only if said holder has been lifted relative to said at least one traction element by said spreading device, and/or said at least one traction element has been lowered relative to said holder.

37. The transporting device according to claim 24, wherein said fingers are to be compressed by a weight force of said transporting belt.

38. The transporting device according to claim 37, wherein said transporting belt rests upon said holder, and a vertical compression of said holder leads to a compression of said fingers.

39. The transporting device according to claim 38, wherein said holder forms a toggle lock.

40. The transporting device according to claim 24, wherein said holder has a stiffening.

41. The transporting device according to claim 40, wherein said stiffening is a basically stiff profiled section disposed in said holder.

42. A transporting device for conveying goods over a transporting route, the transporting device comprising:
   a transporting belt;
   enclosing elements disposed on said transporting belt and forming side walls for said transporting belt, said side walls being flexible and disposed at an angle, other than a right angle, relative to said transporting; and
   a coupling for coupling said transporting belt to a traction element for moving said transporting belt along the transporting route, said coupling having at least one spring element with a gripper embracing the traction element and arms or side sections rigidly connected with said gripper, and wherein the gripper is force-coupled to the traction element by spreading said arms or side sections apart.

43. The transporting device according to claim 42, wherein said enclosing elements grip around an upper and a lower side of an edge of said transporting belt.

44. The transporting device according to claim 43, wherein said enclosing elements have a base with a slot for holding said edge of said transporting belt, and a respective one of said side walls is disposed on said base.

45. The transporting device according to claim 42, wherein said enclosing elements are detachably fastened on said transporting belt.

46. The transporting device according to claim 42, wherein said enclosing elements are non-detachably fastened on said transporting belt.

47. The transporting device according to claim 42, wherein said enclosing elements are straight longitudinal profiled sections with a basically constant cross section.

48. The transporting device according to claim 42, wherein said transporting belt bends around a bend axis perpendicular to a longitudinal axis of said transporting belt and parallel to an upper side of said transporting belt.

* * * * *